July 4, 1950  G. J. WALSLAGER  2,514,266
FISH POLE HOLDER FOR AUTOMOBILES
Filed Jan. 13, 1949

INVENTOR
GEORGE J. WALSLAGER

BY
ATTORNEYS

Patented July 4, 1950

2,514,266

UNITED STATES PATENT OFFICE 2,514,266

FISH POLE HOLDER FOR AUTOMOBILES

George J. Walslager, Milwaukee, Wis.

Application January 13, 1949, Serial No. 70,683

1 Claim. (Cl. 224—42.45)

My invention refers to fish pole carriers for automobile bodies and it has for its object to provide a pair of brackets attachable to the eaves gutter of an automobile top, whereby poles may be conveniently conveyed to the fishing waters, to eliminate rattling of the same and also to prevent injury to the finish of the vehicle body. The poles are readily removed by untying binding tapes associated with the pair of brackets.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Figure 1:
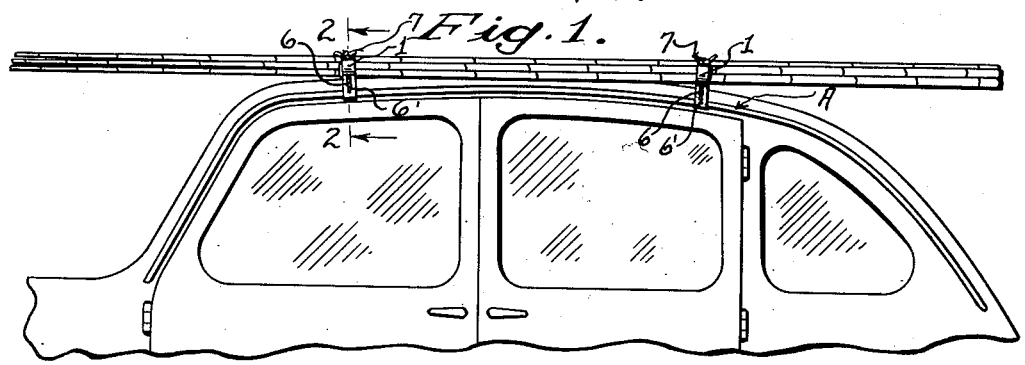
Fig. 1 represents a fragmentary elevation of an automobile body top equipped with pole carrying brackets, embodying the features of my invention.

Referring by characters to the drawings, A indicates an upturned flange at the eaves of the automobile body top forming a standard U-shaped gutter thereabout.

The bracket strips each comprise a concavo-convexed pocket 1 formed from a single strip, the strip being folded back upon itself at the center of the pocket and from said point it is inclined downwardly to form a leg 2, having an intermediate slot 3 therein. The lower end of the leg is formed with an inturned foot 4, for engagement with the bottom face of the flange A, the front side face of which flange abuts the leg.

The leg is associated with a clamping strap 5, having an offset upper end terminating with a tongue 5', which tongue engages the leg slot 3, whereby a lever fulcrum is effected between the tongue connection and the leg of the strap.

Figure 2:
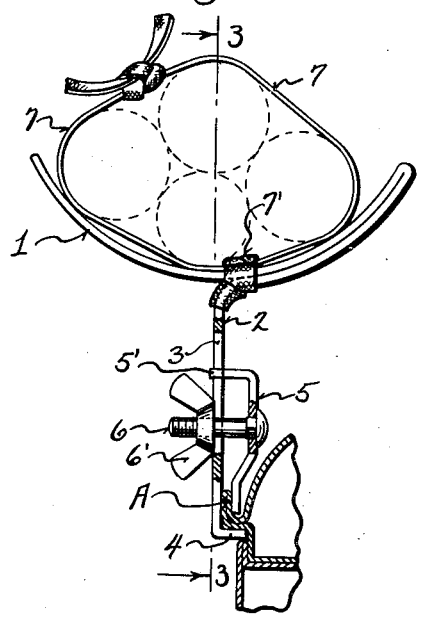
Fig. 2 is an enlarged cross sectional view of the bracket and fragment of the body top, the section being indicated by line 2—2 of Fig. 1.
Figure 3:
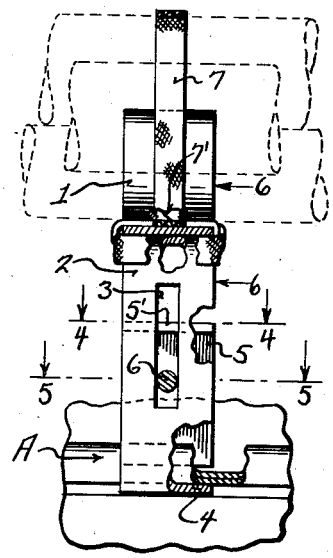
Fig. 3 is a sectional face view of said bracket, the section being indicated by line 3—3 of Fig. 2.
Figure 4:
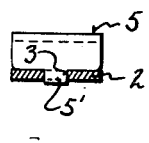
Fig. 4 is a detail cross sectional view through the bracket, the section being indicated by line 4—4 of Fig. 3.
Figure 5:
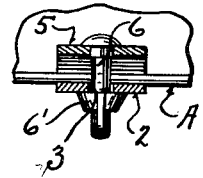
Fig. 5 is another cross sectional view through the bracket, the section being indicated by line 5—5 of Fig. 3.
Figure 6:
Fig. 6 is a fragmentary view of the crotch portion of the bracket, particularly illustrating the anchor tie of a binding tape for the poles.

The lower end of the above mentioned clamping strap 5, extends into the gutter of the flange A and engages the inner wall of said gutter, as best indicated in Figs. 2 and 3 of the drawings.

A tie bolt 6 is carried by the clamping strap 5 and it extends through the leg slot 3 below the nose of said strap, and said tie bolt is provided with a thumb nut 6', whereby the strap and leg are firmly clamped to the flange A of the body top.

Thus it will be noted that the brackets can be readily anchored in position, with reference to the vehicle body top, out of the way of the doors and windows.

When one or a group of fish poles are to be carried, they will be dropped into the bracket pockets and confined therein by flexible tapes 7, which tapes are firmly secured to the crotch of the bracket by knots 7'.

It will be noted that when the poles are fastened to the top of the vehicle, they will not rattle due to the fact that they are firmly anchored to the brackets and also the same are cushioned in the brackets by the fabric tapes. Hence it is apparent that the poles may be readily fastened into position for carrying, and unfastened by simply manipulating the confining tapes 7.

I claim:

In an automobile body having an upturned flange at its eaves, forming a U-shaped gutter; a fish pole holder comprising a one-piece bracket strip folded upon itself to form an arcuate pole receiving pocket, the folded end of the strip being extended downwardly to form a vertically disposed slotted leg terminating with an inturned foot, adapted to engage the base of the U-shaped gutter and the outer face of the gutter flange, a clamping strip having its lower end adapted to engage the inner face of the gutter flange, having its upper end terminating with an offset tongue engaging the leg slot, and a clamping bolt carried by the clamping strip below the offset tongue engaging the leg slot, whereby said leg, in conjunction with the tongue, is held in a vertical position, while the ends of the clamping strip and leg are adapted to engage the inner and outer faces of the gutter flange, together with the base of said flange.

GEORGE J. WALSLAGER.

REFERENCES CITED

The following references are of record in the file of this patent:

UNITED STATES PATENTS

| Number | Name | Date |
|---|---|---|
| 1,748,282 | Ellis | Feb. 25, 1930 |
| 1,798,872 | Ellis | Mar. 31, 1931 |
| 2,209,846 | Pawsat | July 30, 1940 |
| 2,315,387 | Bambanek et al. | Mar. 30, 1943 |
| 2,461,897 | Hopkins | Feb. 15, 1949 |